United States Patent
Vanderspek et al.

(10) Patent No.: US 11,093,151 B1
(45) Date of Patent: Aug. 17, 2021

(54) SIMILARITY MATCHING

(71) Applicant: Exagrid Systems, Inc., Marlborough, MA (US)

(72) Inventors: Adrian T. Vanderspek, Worcester, MA (US); Luis Arruda, Wrentham, MA (US); Peter Watkins, Newton Center, MA (US); Raz Zieber, Westborough, MA (US); Stephen A. Smith, Bedford, NH (US)

(73) Assignee: Exagrid Systems, Inc., Marlborough, MA (US)

( * ) Notice: Subject to any disclaimer, the term of this patent is extended or adjusted under 35 U.S.C. 154(b) by 0 days.

(21) Appl. No.: 16/780,210

(22) Filed: Feb. 3, 2020

(51) Int. Cl.
G06F 12/00 (2006.01)
G06F 3/06 (2006.01)

(52) U.S. Cl.
CPC .......... *G06F 3/0641* (2013.01); *G06F 3/067* (2013.01); *G06F 3/0608* (2013.01); *G06F 3/0614* (2013.01); *G06F 3/0644* (2013.01); *G06F 3/0653* (2013.01); *G06F 3/0683* (2013.01)

(58) Field of Classification Search
CPC ...... G06F 3/064; G06F 3/0602; G06F 3/0608; G06F 3/0614; G06F 3/0641; G06F 3/0644; G06F 3/0653; G06F 3/067; G06F 3/0673; G06F 3/0683; G06F 12/0864; G06F 12/1018; G06F 17/22; G06F 17/30097; G06F 17/30109; G06F 17/30153; H03M 7/30
See application file for complete search history.

(56) References Cited

U.S. PATENT DOCUMENTS

| 9,419,648 | B1 * | 8/2016 | Guilford | G06F 8/52 |
| 2017/0046360 | A1 | 2/2017 | Therrien et al. | |
| 2017/0212907 | A1 * | 7/2017 | VanderSpek | G06F 16/1748 |

FOREIGN PATENT DOCUMENTS

| EP | 2256934 A1 | 12/2010 |
| WO | WO-2017180144 A1 | 10/2017 |

OTHER PUBLICATIONS

European Search Report dated Jun. 23, 2021, European Patent Application 21 155 063.7.

* cited by examiner

*Primary Examiner* — Shawn X Gu

(74) *Attorney, Agent, or Firm* — Mintz Levin Cohn Ferris Glovsky and Popeo, P.C.

(57) ABSTRACT

A method, a system and a computer program product for performing deduplicating data. A data stream having a plurality of data zones is received. One or more data storage locations in a plurality of data storage locations for deduplicating one or more zones in the plurality of zones is identified. Each data storage location stores its respective deduplicated data zones. A data storage location for deduplicating a first data zone is selected. The first data zone is deduplicated using the selected data storage location.

33 Claims, 16 Drawing Sheets

| 32 appliance test | Local lookup only, data not shuffled | Local lookup only, data shuffled | Global lookup, data shuffled | New lookup, data shuffled |
|---|---|---|---|---|
| Average lookups | 5,850.97 | 5,850.97 | 187,200.00 | 19,580.06 |
| Dedup Ratio | 5.87 | 3.09 | 5.87 | 5.84 |
| Lookup Amplification | #N/A | #N/A | 31.99 | 3.35 |
| % of best Dedup | #N/A | 52.69% | 100.00% | 99.50% |

|  | Site A | Site B | Site C |
|---|---|---|---|
| Average match requests (existing system) | 3,174,270.00 | 1,694,536.00 | 7,909,062.00 |
| Average match requests (current subject matter system) | 502,761.94 | 338,343.30 | 2,405,468.00 |
| Match requests reduction | 15.84% | 19.97% | 30.41% |
| Deduplication ratio (existing system) | 8.99 | 8.43 | 12.60 |
| Deduplication ratio (current subject matter system) | 8.88 | 8.36 | 12.40 |
| Deduplication ratio reduction | 98.75% | 99.06% | 98.39% |

1200

SIMILARITY MATCHING

TECHNICAL FIELD

In some implementations, the current subject matter relates to data processing, and in particular, to accelerated and memory-efficient similarity matching of backup data.

BACKGROUND

Many information technology ("IT") operations and activities can be scheduled to run one or more times within some periodic cycle (daily, weekly, monthly, quarterly, etc.). One such application can be data backup. Data backups can be essential to preserving and recovery of data in the event of data loss, for example. To avoid interfering with daily user activities, data backups can be performed during periods of low application server utilization, typically, on weeknights and on weekends. The backup job workload can be the same or different depending on how much data needs to be protected and when. In some applications, backup jobs can be scheduled and/or configured using a commercial backup application, an operating system shell scripting, and/or in any other manner.

Backup applications employ a plurality of techniques to manage data designated for backup, which may include, for example, deduplication, delta-compression, data-compression, etc. Backup data deduplication is a process of identifying similar and/or exact duplicates of segments of data in a backup data stream and storing redundant/similar data in fewer bytes than the original data stream in a lossless compressed manner. This reduces data storage capacity consumption as well as reducing inter-site WAN bandwidth. However, conventional backup systems implement mechanisms that tend to consume a significant amount of compute power, storage bandwidth, and storage capacity, thereby increasing operational costs and reducing efficiency of networks and data storage facilities. Thus, there is a need for an improved accelerated and memory-efficient backup of data.

SUMMARY

In some implementations, the current subject matter relates to a computer-implemented method for performing data deduplication. The method may include receiving a data stream having a plurality of data zones, identifying one or more data storage locations in a plurality of data storage locations for deduplicating one or more zones in the plurality of zones, each data storage location storing its respective deduplicated data zones, selecting a data storage location for deduplicating a first data zone, and deduplicating, using the selected data storage location, the first data zone.

In some implementations, the current subject matter can include one or more of the following optional features. Each data zone in the plurality of data zones may be identified using a zone stamp. Further, each data storage location may store one or more zone stamps corresponding to the data storage location's respective deduplicated data zones.

In some implementations, the selection of a storage location (e.g., appliance) may include comparing a first zone stamp of the first data zone to one or more zone stamps stored at the selected data storage location. Upon determination of a match of the first zone stamp of the first data zone to one or more zone stamps stored at the selected data storage location, a value of a data zone counter associated with the selected data storage location may be set to a maximum value, which may be indicative of a match of the first data zone to the one or more data zones stored at the selected data storage location. Further, a value of data zone counters associated with non-selected data storage locations may be decremented (e.g., decreased, set to zero, etc.) being indicative of a lack of a match of the first data zone to the one or more data zones stored at the non-selected data storage locations. Further, the first data zone may be delta-compressed against one or more data zones stored at the selected data storage location.

In some implementations, upon determination of a lack of a match of the first zone stamp of the first data zone to the one or more zone stamps stored at the selected data storage location the first data zone may be data-compressed and stored in the selected storage location.

In some implementations, identification of one or more data storage locations in a plurality of data storage locations may include generating a list of data storage locations in the plurality of storage locations, and comparing the first zone stamp to zone stamps of each data storage location in the generated list of data storage locations.

In some implementations, the list may be generated based on at least one of the following: a frequency of previous zone stamp matches by a storage location in the plurality of storage locations, a previous zone stamp match by a storage location in the plurality of storage locations, a positive counter value associated with a storage location in the plurality of storage locations being indicative of one or more previous zone stamp matches by a storage location in the plurality of storage locations, a number of times a storage location in the plurality of storage locations, having a positive counter value, that has not generated a data zone match, and any combinations thereof. Further, the method may include selecting a first storage location in the generated list of data storage locations generating a previous zone stamp match, and comparing the first zone stamp to zone stamps using the first storage location. Additionally, the method may exclude one or more data storage locations in the plurality of data storage location from inclusion on the generated list based on a number of times the one or more data storage locations failed to generate a data zone match.

In some implementations, selection of data storage location may include identifying a first data storage location in the plurality of storage locations for deduplicating a first data zone in the plurality of data zones, and determining whether the first data storage location stores a previously deduplicated data zone substantially similar to the first data zone. Upon determining a match between the previously deduplicated data zone and the first data zone at a first zone level, the first data storage location may deduplicate the first data zone. Upon determining that the first data storage location does not store previously deduplicated data zone matching the first data zone at the first zone level, a determination may be made whether another data storage location in the plurality of storage locations stores a previously deduplicated data zone matching the first data zone at at least one of the following: the first zone level and a second zone level, wherein data zones deduplicated at the second zone level are configured to be contained within data zones deduplicated at the first zone level.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 11 illustrates a chart showing comparison of various tests that were executed using 32 appliances;

FIG. 12 illustrates a chart showing comparison of the current subject matter's algorithms executed in three production system environments;

DETAILED DESCRIPTION

To address these and potentially other deficiencies of currently available solutions, one or more implementations of the current subject matter provide methods, systems, articles or manufacture, and the like that can, among other possible advantages, provide for an improved similarity matching of backup data.

Figure 1:
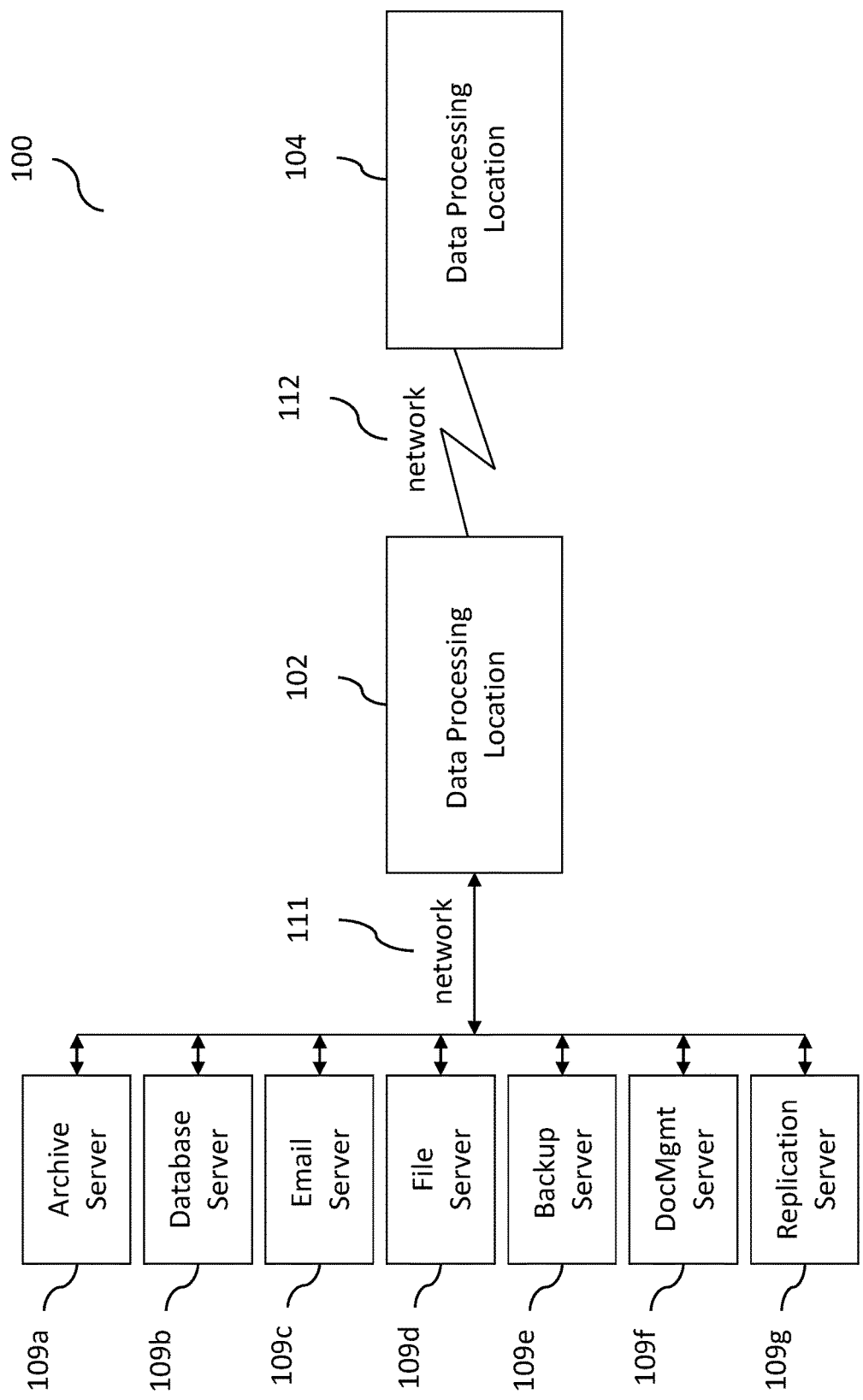
FIG. 1 illustrates an exemplary environment where the current subject matter's accelerated and memory efficient similarity matching processes may be implemented, according to some implementations of the current subject matter.

In some implementations, as stated above, the current subject matter relates to systems, methods, devices, and/or computer program products for performing similarity matching of backup data that may be performed as part of deduplication, delta-compression, data-compression and/or other backup-related processes. Deduplication and compression of backup data workloads may provide significant cost savings to organizations (e.g., organizations running applications 109 as shown in FIG. 1 and discussed below) by reducing an amount of data that may need to be stored in local storage systems (e.g., system 102 as shown in FIG. 1) as well as an amount of data transmitted to disaster recovery storage systems (e.g., remote systems, such as system 104 shown in FIG. 1). However, such deduplication processes may be extremely compute and input/output (I/O) intensive, which in turn, increases time (e.g., to perform a backup, retrieve, etc.), total cost of ownership, etc. of systems running these processes. As such, optimizations that may increase the deduplication ratio, accelerate execution time of the deduplication algorithm, and/or any other aspects of the backup processes may be highly beneficial. In some implementations, the current subject matter may be an improved similarity matching processes that may be performed across a one or more backup appliances, servers, computing systems, nodes, etc. in a scale-out backup deduplication system. Such improved similarity matching techniques may lead to an improved overall deduplication performance, an improved process resilience of a backup system to individual appliance failure, elimination of complexity of distributing/redistributing similarity detection metadata across a changing number of appliances over time, as well as other advantages.

In a deduplication process, unique chunks (e.g., chunks, zones, e-chunks, etc. as will be discussed below) of data, or byte patterns, may be identified, analyzed, and later stored. During deduplication, delta compression processes may be performed, which may include determination of differences and/or delta encoding between various data (e.g., subsequent, similar, and/or any other versions of data). This may allow for more efficient and/or quicker storage and/or transmission of data between various nodes in a computing system. The determined differences (or deltas) between files, rather than complete files, may be stored/transmitted. The deduplication process can reduce data storage capacity consumption as well as inter-site WAN bandwidth. There are many ways to implement data deduplication functions. Some techniques rely on identifying exact chunks of data and only maintaining a single image of chunks that have one or more duplicates. In typical applications (as shown in FIG. 1 for example) such as backup, archiving, etc., delta compression may consume significant amounts of CPU (central processing unit) that may be located within data processing location 102, memory and I/O (input/output) resources, and thus, slow down performance of a computing system.

FIG. 1 illustrates an exemplary environment where the current subject matter's accelerated and memory efficient similarity matching processes may be implemented. In particular, FIG. 1 illustrates an exemplary system 100 for processing (e.g., deduplicating, storing, etc.) one or more streams of data received from a variety of sources 109 (a, b, c, d, e, f, g). The source 109 can include an archive server 109a, a database server 109b, an email server 109c, a file server 109d, a backup server 109e, a document management server 109f, a replication server 109g, as well as any other application, business object, business process, business process application, server, software, hardware, etc. The system 100 may further include data processing locations 102, 104 and networks 111, 112. The network 111 may communicatively couple the data processing location 102 and source 109 and the network 112 can communicatively couple the data processing location 102 and the data processing location 104. In some implementations, the data processing location 102 may be located in the same physical location as the sources 109. Alternatively, the data processing location 102 may be remote from the sources 109. The data processing location 104 may be remotely located from the sources 109 and/or data processing location 102. For example, the data processing location 104 may be a recovery site for the data received from the source 109.

The data processing locations 102 and/or 104 may include one or more computing devices, systems, servers, hardware, software, and/or any combination of hardware and/or software, which may be communicatively coupled with one another using various wireless and/or wired connections, networks, etc. The networks 111, 112 may be any wireless and/or wired networks, wide area networks ("WAN"), metropolitan area networks ("MAN"), local area networks ("LAN"), Internet, extranet, intranet, as well any other type of network.

In some implementations, the data processing location 102 may receive data stream(s) from sources 109 and may perform an initial processing (e.g., deduplication, delta-compression, data compression, analysis, etc.) of the received data. Additionally, the data processing location 102 may also perform retrieval of data, when requested to do so by source(s) 109. The data may be stored in a storage local to the data processing location 102 (not shown in FIG. 1). The data may be sent to data processing location 104 and stored in a storage local to the data processing location 104 (not shown in FIG. 1). For example, critical application data may be stored at a local facility (e.g., as represented by the data processing location 102) and/or at a geographically distant remote facility (e.g., as represented by the data processing location 104) in order to provide for a full recovery in the event of system failure, site disaster, or any other unprecedented condition or event.

In some implementations, the current subject matter, e.g., implemented in the system 100 shown in FIG. 1, may process backup data streams and apply a multi-level (e.g., a two-tiered) deduplication process to reduce backup data storage capacity, inter-data center network bandwidth, etc. Exemplary process for executing multi-level deduplication are illustrated in co-owned U.S. Pat. No. 9,703,707 to Therrien et al., issued on Jul. 11, 2017, and entitled "Multi-Level Deduplication" and U.S. Pat. No. 10,067,946 to Vanderspek et al., issued on Sep. 4, 2018, and entitled "Next-level Multi-level Deduplication", the disclosures of which are incorporated herein by reference in their entities.

Figure 2A:
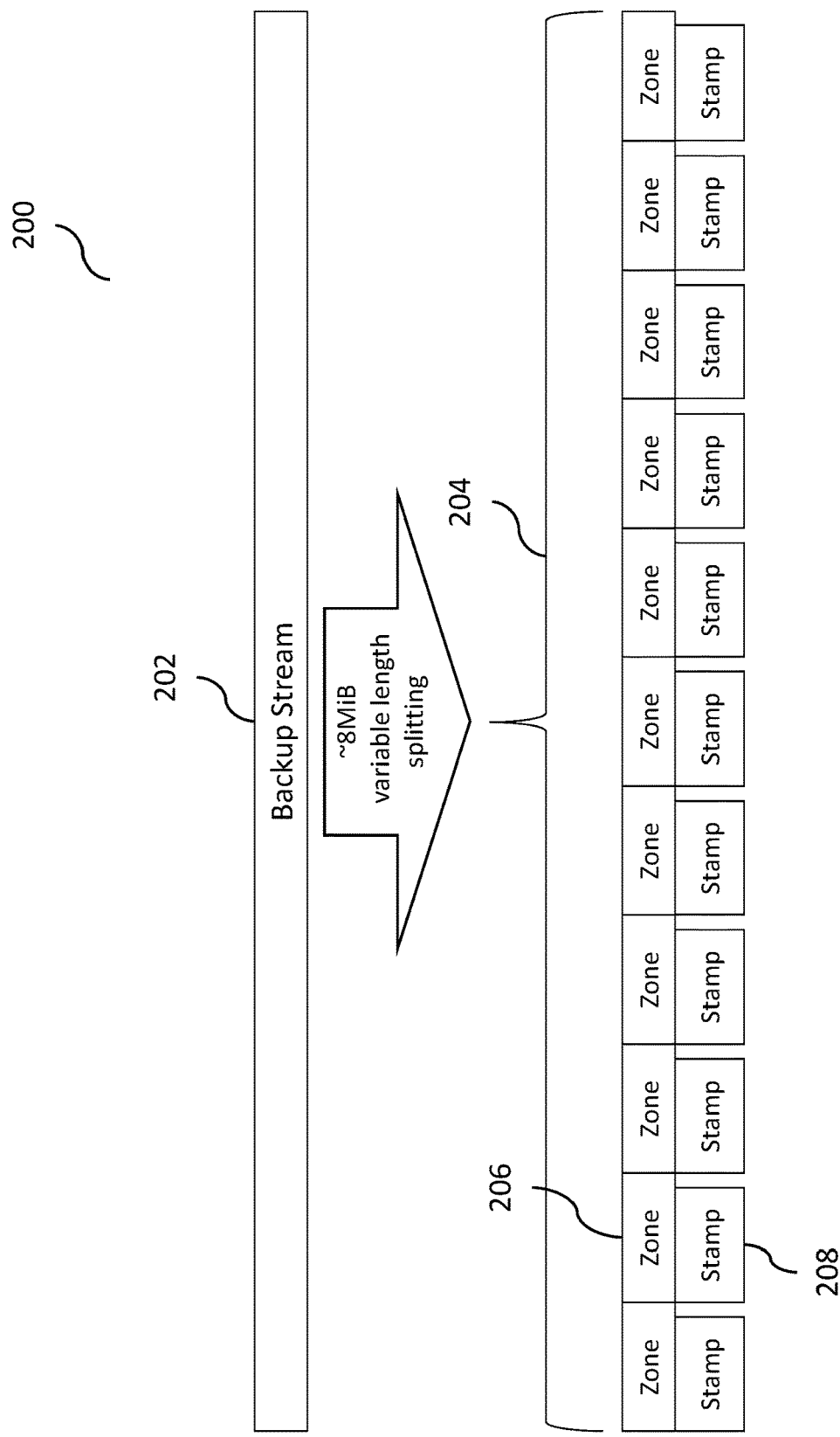
FIG. 2a illustrates an exemplary backup process, including splitting a backup stream into in a plurality of zones and generating corresponding zone stamps/match information, according to some implementations of the current subject matter.

FIG. 2a illustrates an exemplary backup process 200, including splitting a backup stream into in a plurality of zones and generating corresponding zone stamps/match information, according to some implementations of the current subject matter. The process 200 may be performed by the system 100 shown in FIG. 1. During the process 200, an incoming backup stream 202 may be received by a deduplication appliance (e.g., appliance 102 shown in FIG. 1). The stream 202 may then be split into a variable size zones 204 (e.g., the zones may have a variable length but not exceeding approximately 8 MiB or any other size (e.g., an exemplary, non-limiting range of sizes of zones may be in a range of approximately 8 MiB to 100 MiB and/or any other values). Zones may be contiguous and/or non-contiguous segments of the incoming data, e.g., entire files, an aggregation of multiple files, etc. For each zone in a data stream, a zone stamp may be generated and/or computed based on a content of the zone's data bytes. Splitting of the stream 202 into zones 204 may also include generation of a match information for each zone (e.g., generated zone 206 may have a match information or stamp 208). The match information may be used to search and/or identify existing zones that may be similar to any new zones contained within incoming backup streams 202. The zone stamp may constitute the determined match information for a particular zone.

A zone stamp may be a string containing up to 64 characters (and/or any other number of characters), which, in some exemplary implementations, may be smaller than or equal to the size of the zone it represents. Because of the smaller size of zone stamps, the entire list of zone stamps may be stored in a main memory (e.g., a high-speed memory location) to allow them to be quickly and/or efficiently compared to each other in order to identify zones whose content may be similar and/or identical and/or substantially identical to one another. Such zones of data may then be delta compressed against each other so that the zones may be replaced by one unaltered zone and another delta compressed zone that may contain just the bytes that are different between the zones.

In some implementations, the current subject matter may perform processing of one or more streams of data (e.g., backup streams of data or any other data streams). The data stream may include a plurality data zones and each zone may be associated with a zone stamp identifying that zone. The current subject matter may generate such zones and zone stamps based on the analysis of the received data steam(s). The zone stamps may be compared to one another (whether or not the zones are within the same data stream or not). In some implementations, the current subject matter may compare zone stamps for zones at corresponding zone levels (e.g., level-1, level-2, etc. zones) based on a determination that a zone stamp of a zone of a preceding zone level is not similar to another zone stamp of another preceding zone level. The zone at the preceding zone level may include at least one zone of a next zone level having a size smaller than or equal to a size of the zone of the preceding zone level. However, if there are zones that do not match other zones of similar size and/or content (and/or any other characteristic) within a particular level of deduplication (e.g., "level-1" zones), any unmatched zones may then be broken up into further smaller sized zones to determine whether there is a match among the zones within that zone or with other zones. The smaller size zones may be matched to zones that have similar characteristics. These smaller size zones may be matched at a lower level, e.g., "level-2". This process may continue indefinitely and/or until a predetermined level of zones have been reached (e.g., size of a zone). Once the comparison is completed, the current subject matter may perform deduplication of the zones based on a determination that one zone stamp is similar to another zone stamp.

In some implementations, the current subject matter relates to a method for performing a backup data deduplication process that may be configured to be executed on one or more appliances (e.g., computing systems, nodes, servers, grid servers, etc.) within a data site and/or a data center (e.g., a computing network, a computing system, one or more computing nodes, one or more computing servers, one or more grid servers, etc.). The current subject matter may be configured to execute a deduplication process based on a similarity detection with a downstream delta compression for similar segment of a backup data stream. Similar to the discussion in FIG. 2a, backup data streams may be split into one or more zones (e.g., approximately 2 MB-100 MB in size or any other size) using variable length content splitting techniques. Metadata (e.g., characterizing, identifying, etc. each zone) may be maintained for each new zone in order to determine whether the content of such new zone may be similar to the content of one or more existing zones that may have been already deduplicated and/or stored on any appliances in one or more sites. If a new match is found, the new zone is delta compressed against the existing zone, and the delta is stored. Otherwise, the new zone is stored self- or data-compressed.

In some implementations, for level-1 zone matching, similarity detection metadata may be maintained in a stamp catalog, where the stamp catalog may be distributed across all appliances (e.g., servers, etc.) in the data site. As discussed above, this process may proceed with creating a stamp for each new zone based on the content of the zone. All stamps may be maintained in a single catalog, which may be sorted by size(s) of zone(s). The stamp catalog may be subdivided into N segments based for the N deduplication appliances that were deployed at the data site.

Figure 2B:
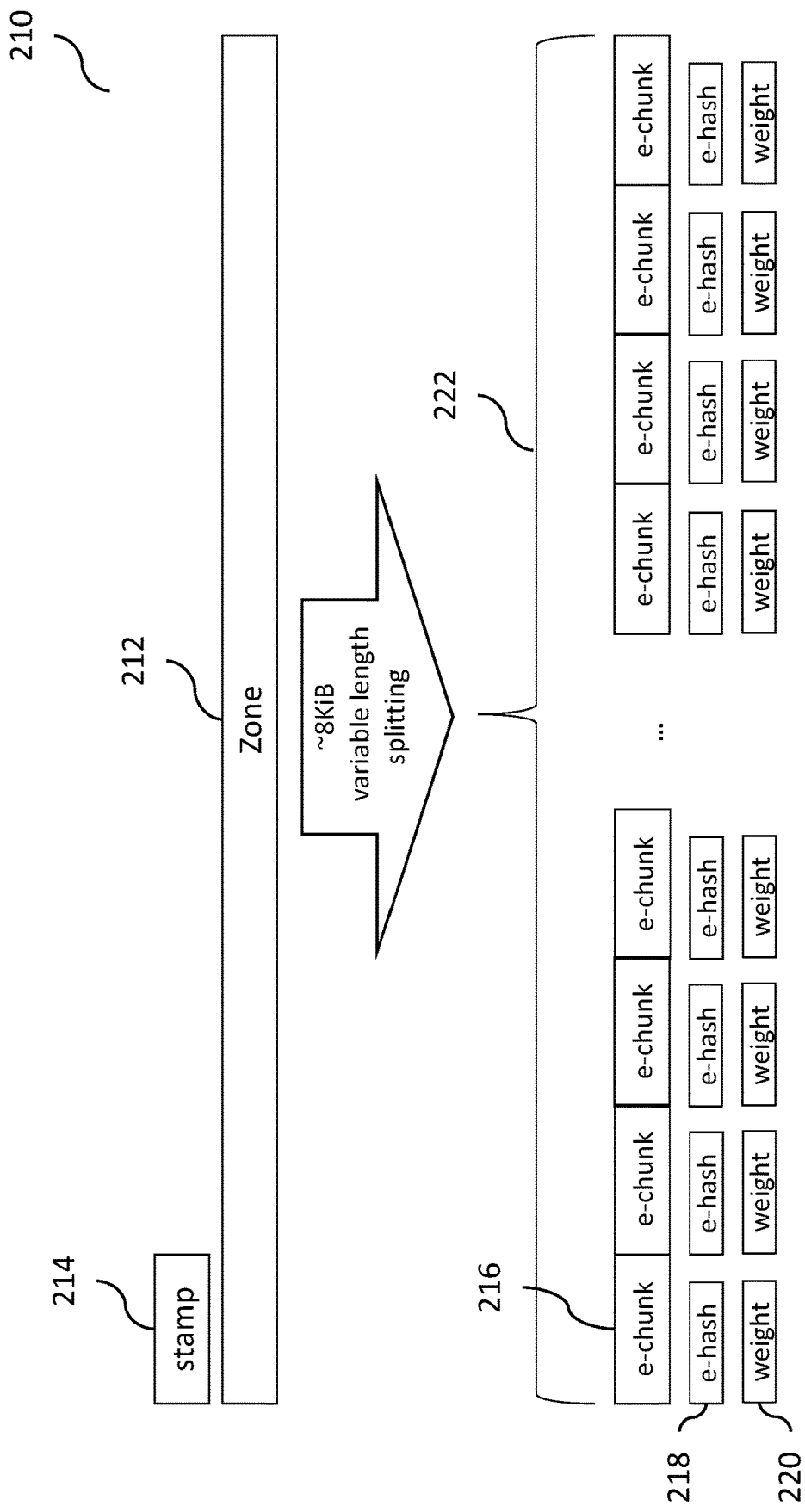
FIG. 2b illustrates an exemplary process for further splitting zones generated in FIG. 2a into further chunks, according to some implementations of the current subject matter.

FIG. 2b illustrates an exemplary match information that may be generated during process 200 (shown in FIG. 2a) and that may be used to search for similar zones, according to some implementations of the current subject matter. During the deduplication process 200, a zone stamp 214 may be generated for each variable size zone 212 (e.g., zones 206 shown in FIG. 2a). In some implementations, each zone may also split into variable length data chunks or "e-chunks" 222 (by way of a non-limiting example, each e-chunk may be approximately 8 KiB (e.g., the target size of the e-chunk may be 8 KiB with a minimum of 2 KiB and a maximum of the remainder of the zone.)) Further, each such e-chunk 214 in the plurality of e-chunks 222 may have an associated hash value or "e-hash" 218. In some exemplary, non-limiting implementations, e-hash 218 may be generated using any known hashing algorithm, such as, for example, a CRC32 algorithm. CRC32 algorithm may generate concise 32-bit hashes, thereby minimizing memory consumption. The CRC32-based hashing may be one of the fastest hashes that may be computed. This is an important aspect of this hashing process, as thousands of hashes may be computed for each zone. The lowest-valued 8% of these hashes may be used for multi-level deduplication and/or similarity detection processes. (As can be understood, any percentage of hashes may be used, where an exemplary, non-limiting value of 8% was experimentally selected as an optimal compromise between catalog size and matching accuracy, as for example, explained in U.S. Pat. No. 10,067,946 to Vanderspek et al., issued on Sep. 4, 2018, and entitled "Next-level Multi-level Deduplication", the disclosure of which is incorporated herein by reference in its entirety).

In some implementations, a corresponding weight value 220 for each e-chunk 214 may be also generated. The weight may correspond to the byte length of the e-chunk 214. In some cases, the same e-hash 218 may appear more than once in a zone, then the e-hash weight 220 may be determined as the sum of all e-chunk lengths that it represents in that zone.

Figure 3A:
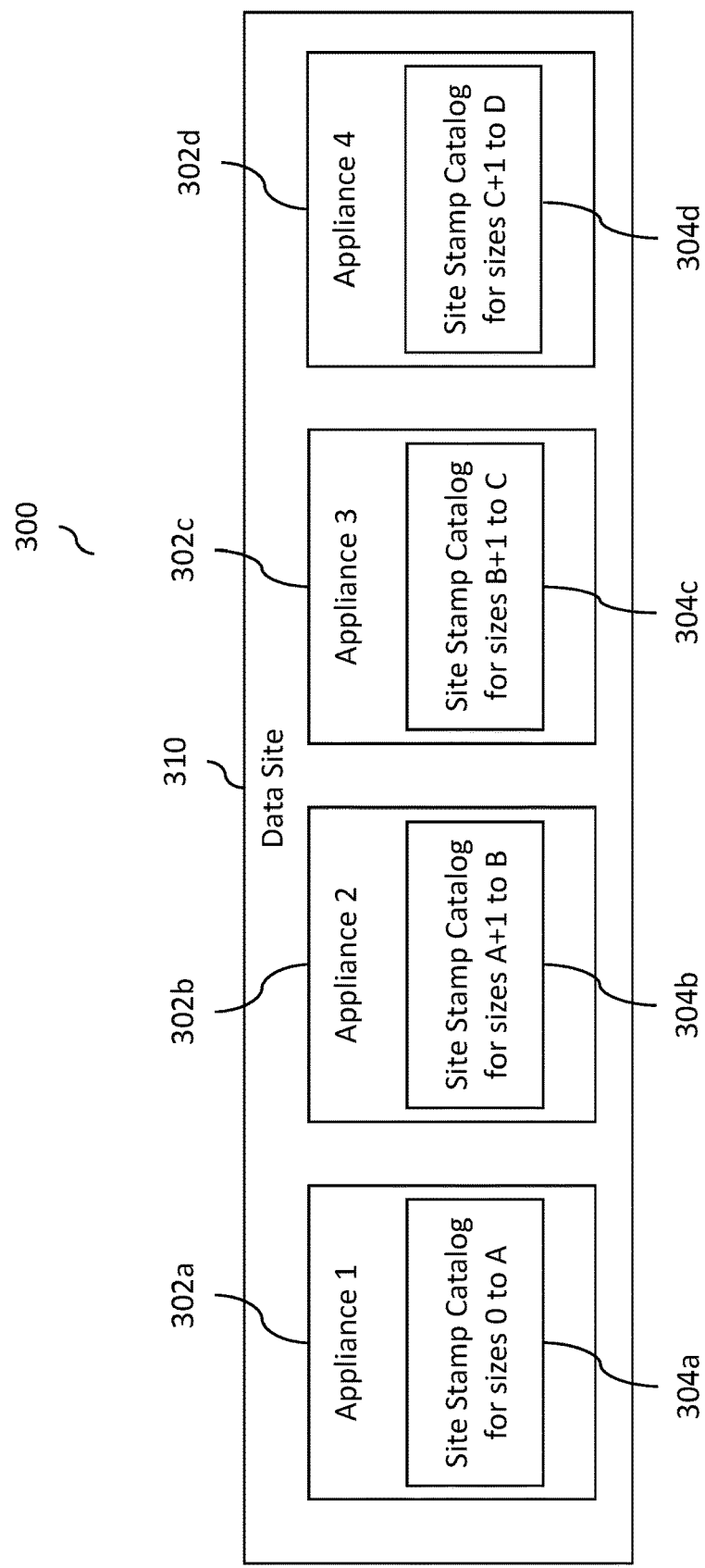
FIG. 3a illustrates an exemplary deduplication system.

FIG. 3a illustrates an exemplary deduplication system 300. The system 300 may include a data site 310 that may be configured to receive a backup data stream, perform deduplication, delta-compression, data-compression, etc. The data site 310 may include one or more deduplication appliances (e.g., computing systems, nodes, servers, grid servers, etc.) 302 (a, b, c, d). As can be understood, the data site 310 may include any number of appliances 302. Each appliance 302 may be configured to store a respective catalog 304 (a, b, c, d) of zone stamps that may be corresponding to one or more previously deduplicated zones. The appliances 302 and, hence, the catalogs 304 may be organized by sizes of zones. For example, the appliance 302a may store a catalog 304a of zone stamps identifying zones having sizes from 0 to A; appliance 302b may store a catalog 304b of zone stamps identifying zones having sizes from A+1 to B; appliance 302c may store a catalog 304c of zone stamps identifying zones having sizes from B+1 to C; and appliance 302d may store a catalog 304d of zone stamps identifying zones having sizes C+1 to D. Sizes A, B, C, D may be any sizes and may be expressed in any desired size units (e.g., KB, MB, etc.). During similarity matching process executed for a newly received/processed zone and all existing zones, such new zone may only be compared against previously stored deduplicated zones that are within a predetermined size threshold (e.g., +/−0.5%) of the size of the new zone. This may reduce search time for a similar zone.

Figure 3B:
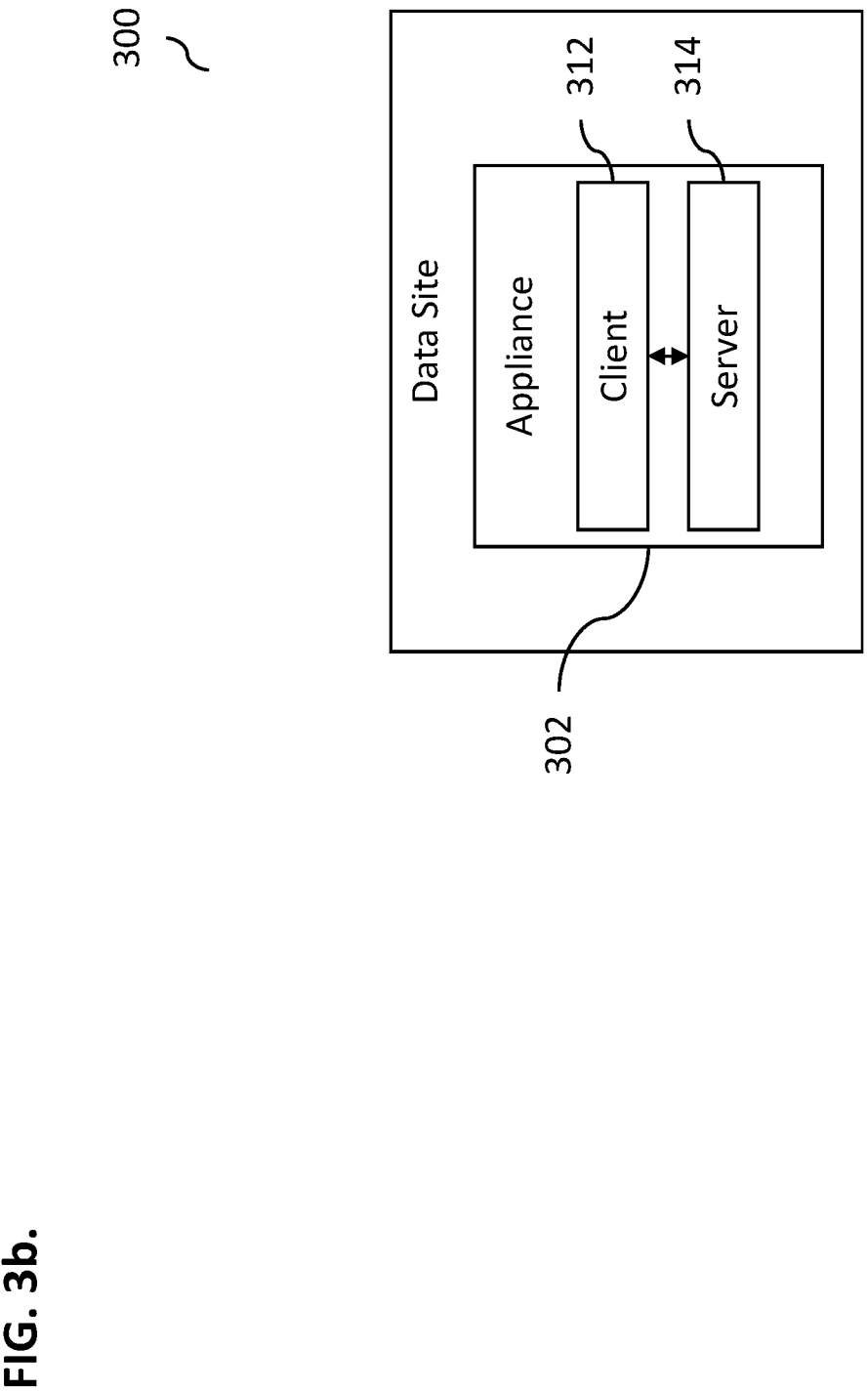
FIG. 3b illustrates an exemplary appliance at a deduplication site.
Figure 4:
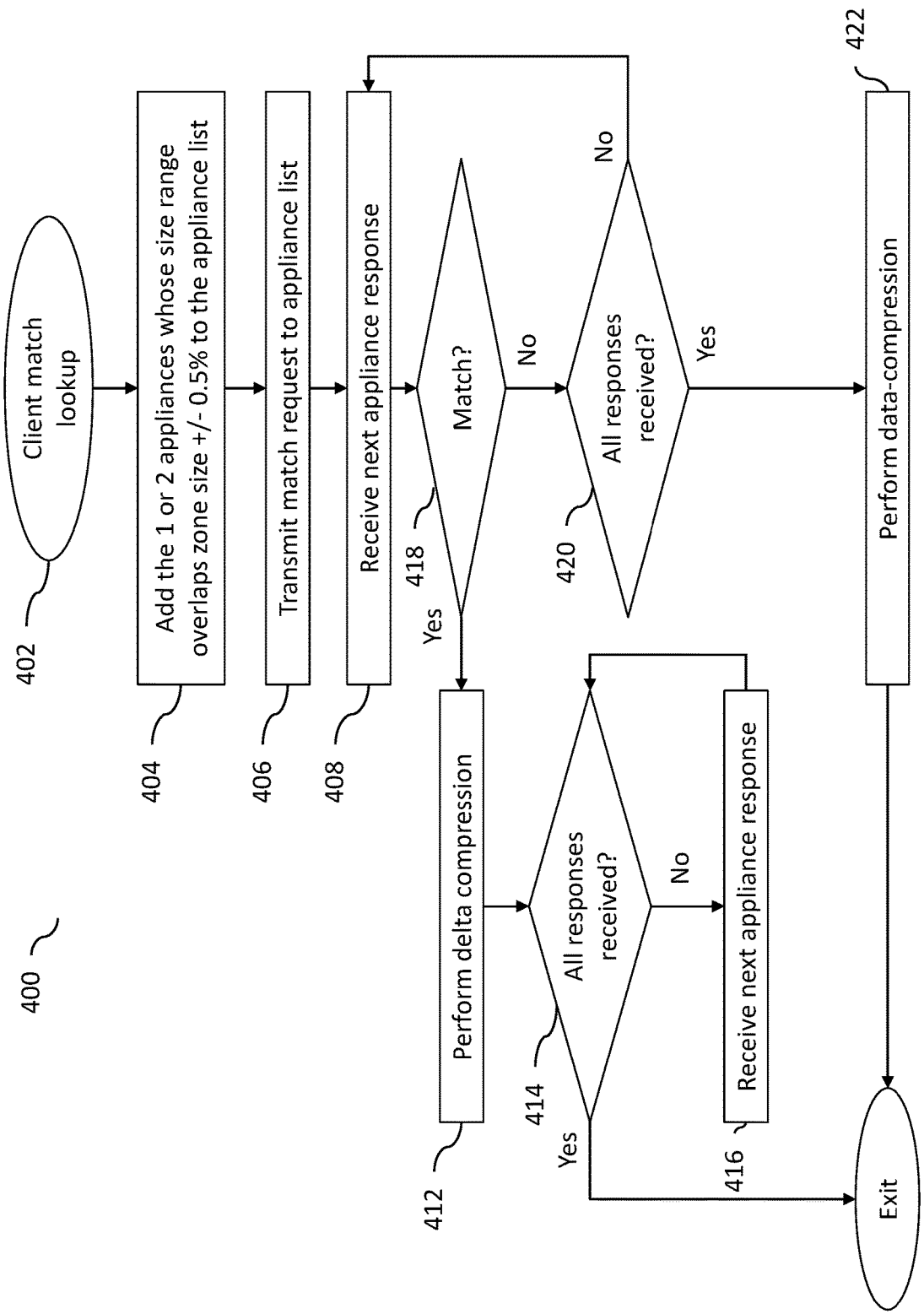
FIG. 4 illustrates an exemplary stamp matching process, according to some implementations of the current subject matter.

FIG. 4 illustrates an exemplary stamp matching process 400, according to some implementations of the current subject matter. By way of an example only (as shown in FIG. 4), the process 400 may be configured to be used by a client system to perform a level-1 stamp matching. As shown in FIG. 3b, the "client system" or a "client" 312, as used in the following discussion, may refer to a process (e.g., software, hardware, and any combination thereof) that may be executed on an appliance (e.g., appliance 302 (similar to appliances 302 (a, b, c, d) shown in FIG. 3a) as shown in FIG. 3b) located within the data site 300. The site may be configured to receive one or more data zones for backup/deduplication. Further, the client 312 may be configured to request execution of a similarity matching operation to all zone/zone stamps that may be stored on that site. Moreover, the term "server" 314, as used in the following description, may refer to one or more processes running on an appliance in a site that may be configured to receive a request from client 312 to match one or more zones/zone stamps to zones/zone stamps stored in that site. The server 314 may be configured to perform a match lookup process using its stored catalogs and may be further configured to return match results to the client 312.

Referring back to FIG. 4, at 402, a request from a client to perform a match lookup of zone stamps (as may be previously computed) for a newly received zone may be received at a site that may include one or more appliances. Using a size of the received zone, a list of appliances that may include (e.g., store) potentially matching deduplicated zones may be searched for and identified, at 404. The search for the appliance candidates may be executed using a stored zone stamp catalog, where the search would look for appliances storing zones, as identified by a catalog of zone stamps, that are within +/−0.5% the size of the newly received zone. In some implementations, the zones may be stored entirely within the stamp catalog size range and hosted by a single appliance. This way a stamp match request may be transmitted to the server of a single appliance that holds the size specific zone stamp catalog. However, periodically, the stamp match size range may be such that it may be contained within separate catalogs of one or more appliances' stamp catalogs' size ranges. In this case, the request (at 402) may be transmitted to such one or more appliances, at 406. Such distribution of the stamp catalog may allow scaling from one appliance to any number of site appliances to permit distribution of compute-intensive search processes across all appliances.

At 408, one or more responses from identified appliances (at 404) may be received. If a match between zone stamps is determined, at 418, the process 400 may be configured to perform delta-compression of the newly received zone, at 412. If there are multiple appliances that have been identified, the process of delta-compression, at 412, may be repeated for each until all appliances have responded, at 414-416. Once all responses are received, the delta-compression process may terminate ("Yes" at 414), whereby the newly delta-compressed zone may be stored.

If there is no match, at 418, the process may repeat until all appliances respond, at 420. If one of the appliances responds with a match, then the process 400 may proceed to 412, where delta-compression is executed. Otherwise, if no match is found (e.g., all identified appliances responded with a "no match"), data compression, at 422, of the newly received zone may be performed, and the process 400 may terminate.

Figure 5:
FIG. 5 illustrates an exemplary stamp matching process, according to some implementations of the current subject matter.

FIG. 5 illustrates an exemplary stamp matching process 500, according to some implementations of the current subject matter. By way of an example only (as shown in FIG. 5), the process 500 may be configured to be used by a client system to perform a level-2 stamp matching (e.g., that may be performed in addition to the level-1 stamp matching process). In some implementations, level-2 matches may be performed when no match is found at level-1. In that regard, level-2 match process is not limited to searching within a specific zone size threshold (e.g., +/−0.5%) of the new zone size. In some implementations, all level-2 match requests for a new zone may be transmitted to all the appliances at the site receiving the new zone.

Referring to FIG. 5, at 502, a request from a client to perform a match lookup of zone stamps (as may be previously computed) for a newly received zone may be received at a site that may include one or more appliances. As stated above, the request may be transmitted to all appliances that may be located at the site receiving the new zone, at 504.

In some implementations, the current subject matter may be configured to process one response from an appliance at a time. In alternate implementations, multiple responses may be processed from one or more appliances simultaneously, and/or in any predetermined order. For ease of illustration only, the following description will refer to processing one response from an appliance at a time.

At 506, a response from one or more appliances may be received. Based on responses from appliances, a determination of whether or not there is a level-1 match may be made, at 508. If there is a level-1 match, the received zone may be delta-compressed, at 520. If there are still outstanding responses, the client may be configured to receive the remaining responses and perform no additional processing on the responses, at 522-524. Once all responses are received, the process 500 may be configured to terminate, whereby the delta-compressed zone may be stored.

However, if at 508, there is no level-1 match, as determined from the current response, the process 500 may be configured to proceed to determine a match of the received zone at level-2. A determination may also be made to determine if the next level 2 response may be "better" (e.g., more closely matching) than the best level 2 response that may have been obtained up to this point, at 510. If so, the best level-2 result may be updated accordingly, at 512. A check may then be performed to determine whether all appliances have responded, at 514. The process 500 may then return to 506 if there are outstanding appliances that have not yet responded.

Once all responses are received, the best level 2 response may be checked to determine whether it constitutes a level-2 match, at 516. The best level 2 match, if found at 516, may be delta compressed, at 520. Otherwise, the newly received zone may be data compressed, at 518, and subsequently stored, thereby terminating the process 500.

Figure 6:
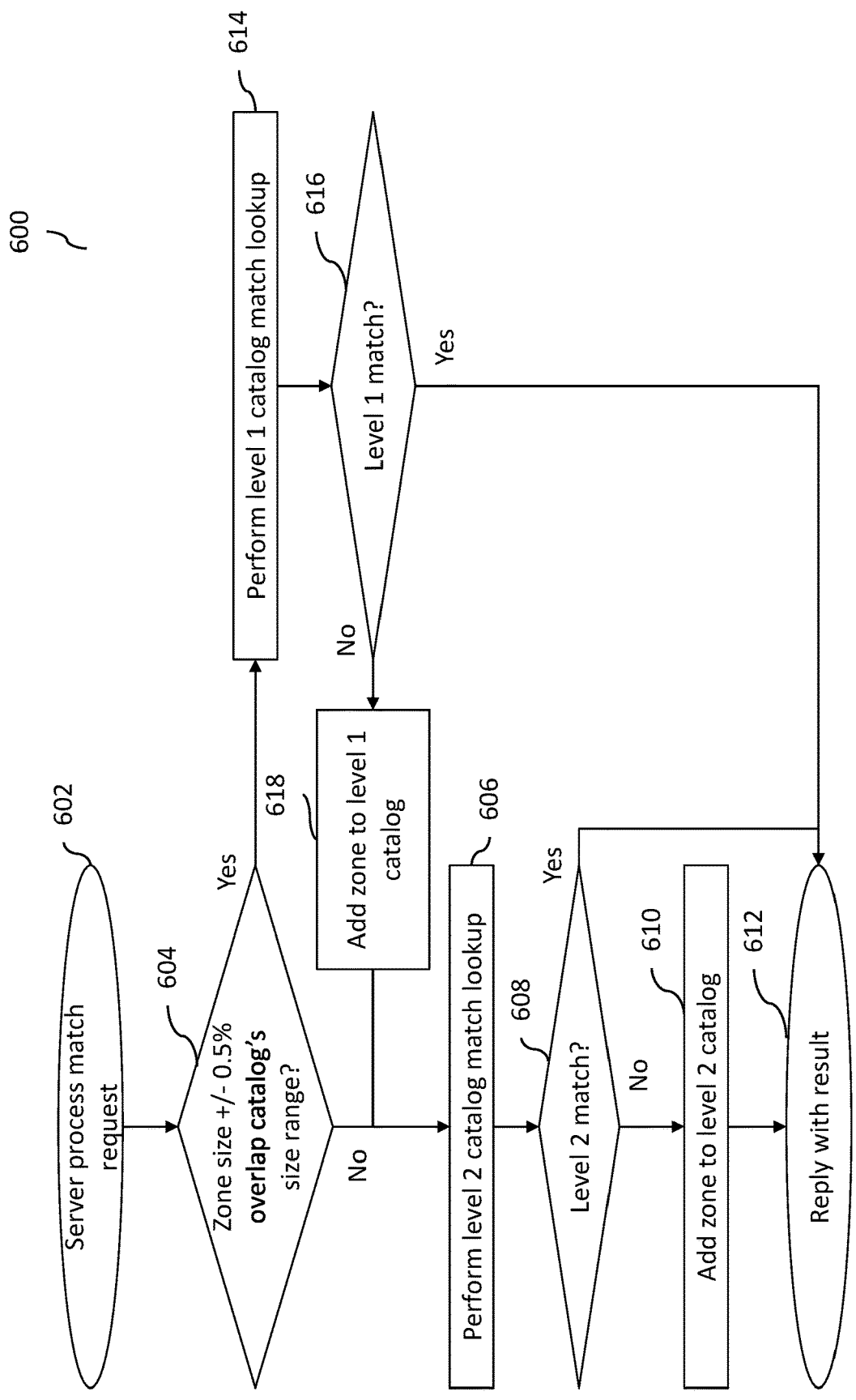
FIG. 6 illustrates and exemplary process for executing a match request received from a client, according to some implementations of the current subject matter.

FIG. 6 illustrates and exemplary process 600 for executing a match request received from a client, according to some implementations of the current subject matter. The request may be processed by one or more servers that may be associated with one or more appliances. The server(s) may store catalogs of zone stamps, where each server may store catalogs of zone stamps associated with zones of particular size ranges. For example, if a received request is determined to be within a particular server's level-1 catalog size range, the server may execute a lookup using its segment of the zone stamp catalog. If a level-1 match is found, the server may be configured to respond with the level-1 zone stamp match. If a level-1 match is not found, a level-2 lookup may be executed. A response based on the level-2 lookup may then returned.

As shown in FIG. 6, at 602, the server may be configured to receive a request to process a particular zone for a match in accordance using a zone stamp catalog. The server, at 604, may determine whether the size of the received zone is within a predetermined threshold (e.g., within +/−0.5%) of the size of a particular zone sizes corresponding to zone stamps in its portion of a zone stamp catalog. If so, level-1 catalog match lookup may be performed by the server, at 614. If a match is found, at 616, the server may return the match result, at 612.

Otherwise, if there is no level-1 match, at 616, the server may be configured to add a zone stamp corresponding to that zone to level-1 zone stamp catalog, at 618. Then, the server may perform a level-2 matching of zone stamps, at 606. Similarly, if a particular received zone is not within the predetermined threshold (e.g., within +/−0.5%) of the size of a particular zone sizes corresponding to zone stamps in its portion of a zone stamp catalog, at 604, the level-2 matching process may also be executed, at 606.

If level-2 match is found, at 608, the server may be configure to return the level-2 match, at 612. Otherwise, the zone stamp corresponding to the received zone may be added to a level-2 catalog of zone stamps, at 610, and the server may return that result as well, at 612.

In some implementations, while level-1 and level-2 processes functionally implement an effective similarity detection function for backup data deduplication, these processes may have various implementation issues, such as, for example Performance scalability: sending every similarity match lookup request to every appliance in a site may present a performance scaling issue. For example, in a site having N appliances, each individual appliance's zone stamp catalog and e-chunk hash catalog may need to handle N times more match requests per second than it would in a site having a single appliance.

Availability: segmenting level-1 zone stamp catalog and distributing it across all appliances may also present an appliance availability issue, in that, all appliances may need to be operational for a match lookup to complete. Other processes may be implemented to handle redistributing of a stamp catalog when an appliance is added or removed from the set of appliances at the site. For example, an appliance may drop out from the set because of appliance-level hardware failure.

Load balancing: distributing level-1 stamp catalog among appliances based on zone size may present an issue in that size distribution of zones might not be evenly distributed, as the distribution might not be known in advance and may vary over time. This may cause some appliances to host more zones than they can/should, while others may host too few. New processes may need to be added to monitor for this condition and redistribute the stamp catalog if any particular appliance's zone stamp catalog is hosting a disproportionate number of zone stamps.

In some implementations, the current subject matter may be configured to address the above issues by effectively managing stamp and e-chunk hash matches for each new zone through an improved distribution of a zone stamp catalog and execution of match requests. The current subject matter system may be configured to have one or more of the following characteristics:

level-1 zone matches may have a much higher average compression ratio than level-2 zone matches;
actual level-1 zone matches may be found where the new zone and the matching zone may be stored on the same appliance;
appliances that recently returned a match may be more likely to return a match again.

Figure 7:
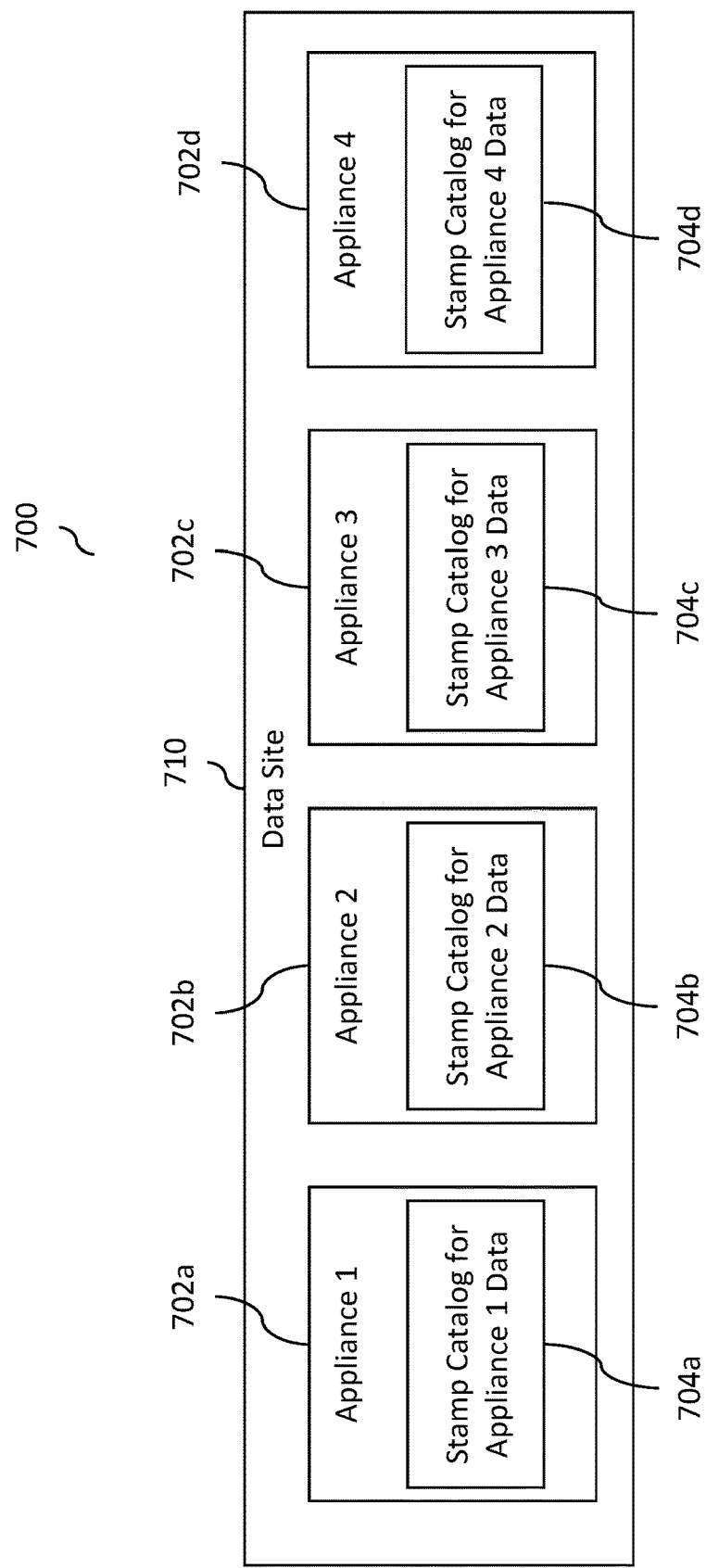
FIG. 7 illustrates an exemplary deduplication system, according to some implementations of the current subject matter.

FIG. 7 illustrates an exemplary deduplication system 700, according to some implementations of the current subject matter. In system 700, each appliance's catalog may be configured to keep track of zones that are stored locally on that specific appliance, which may be configured to eliminate issues related to distribution/redistribution of catalog(s). In particular, the system 700 may include a data site 710 that may be configured to receive a backup data stream, perform deduplication, delta-compression, data-compression, etc. The data site 710 may include one or more deduplication appliances (e.g., computing systems, nodes, servers, grid servers, etc.) 702 (a, b, c, d). As can be understood, the data site 710 may include any number of appliances 702. Each appliance 702 may be configured to store its own respective catalog 704 (a, b, c, d) of zone stamps that may be corresponding to one or more previously deduplicated zones that may be stored on that appliance. For example, the appliance 1 702a may store a catalog 704a of zone stamps identifying zones stored on appliance 1; appliance 2 702b may store a catalog 704b of zone stamps identifying zones stored on appliance 2; appliance 3 702c may store a catalog 704c of zone stamps identifying zones stored on appliance 3; and appliance 4 702d may store a catalog 704d of zone stamps identifying zones stored on appliance 4. During similarity matching process executed for a newly received/processed zone and all existing zones, such new zone may only be compared against previously stored deduplicated zones that are stored on a specific appliance. In some implementations, since the stamp catalog is no longer distributed among appliances, the current subject matter system may be configured to predict which appliances(s) to send new zone match requests to in order to avoid performance scaling issues (as discussed above) of sending all requests to all appliances.

Figure 8:
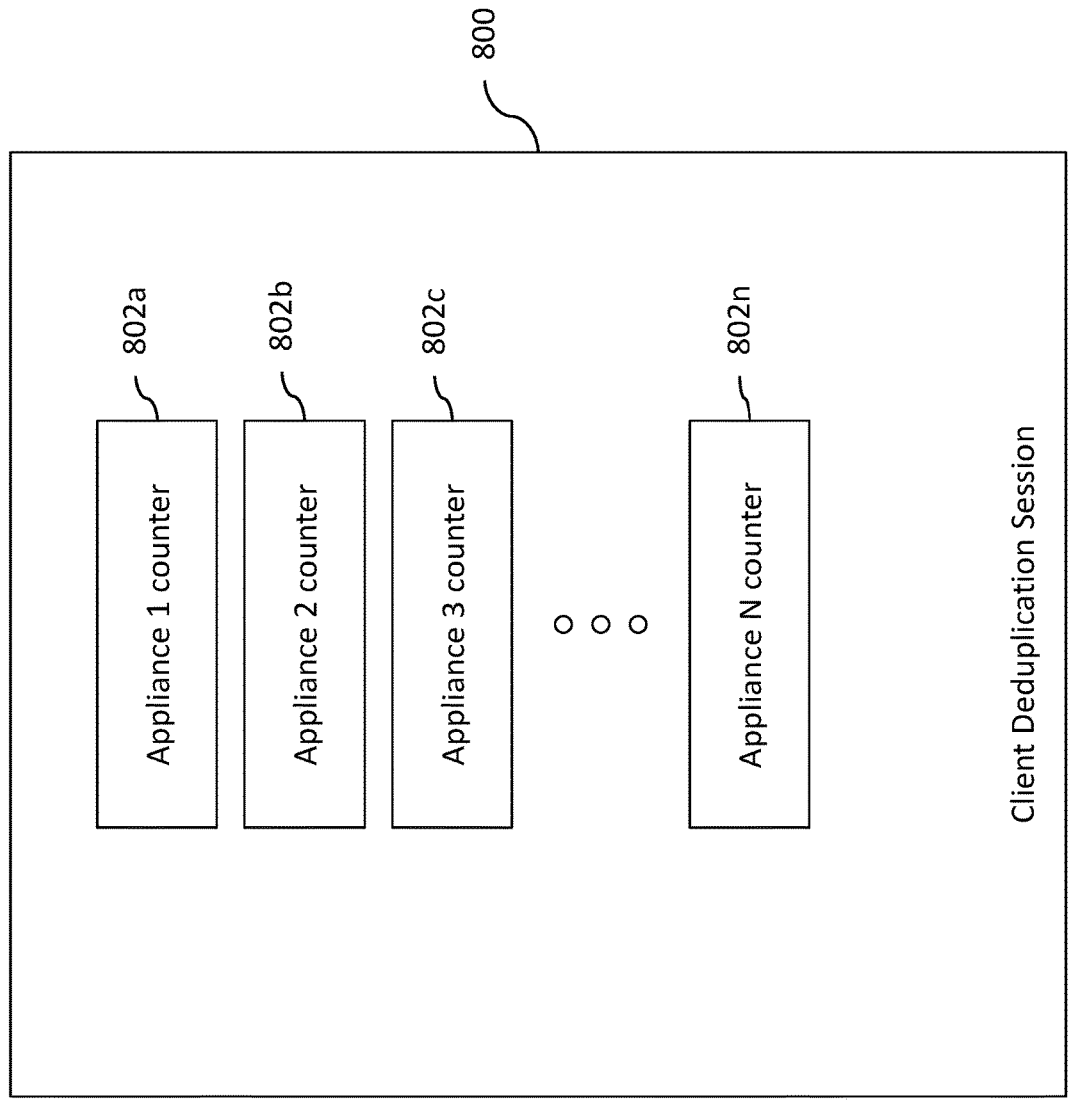
FIG. 8 illustrates an exemplary deduplication session data structure, according to some implementations of the current subject matter.

In some implementations, the current subject matter may be further configured to implement one or more appliance-specific counters that may be used during a particular deduplication session. The counters may be used to identify requests that may be sent to a particular appliance. FIG. 8 illustrates an exemplary deduplication session data structure 800, according to some implementations of the current subject matter. The deduplication session 800 may be configured to be associated with a particular client. The session 800 may be further configured to include appliance specific counters 802. For example, appliance 1 may be associated with counter 802a; appliance 2 may be associated with counter 802b, etc. The counters may be implemented as software, hardware, and/or any combination thereof. In some implementations, the counters may be initialized to a maximum value (e.g., 100). Whenever a match is found in a particular appliance (e.g., appliance 1), that appliance's counter (e.g., counter 802a) for that deduplication session (e.g., deduplication session 800) may be reset to the maximum value while all other appliances in the list may be decremented until they reach 0. In some exemplary implementations, the client's query algorithm may be executed to give preference to querying appliances with non-zero counters.

In some implementations, the counters may be configured to correspond to state information for an appliance (and/or a set of appliances) that is being indicative of appliance's data zone matches. Such state information may be used to predict which appliances may be likely to yield data zone matches. The appliances that are determined to generate more frequent (and/or better) matches may be queried first and/or more often for any new data zone processing request that may be received at the site. This may avoid an approach of querying every appliance at the site. Further, in some implementations, the current subject matter, in response to receiving a new data zone match request, may be configured to query first and/or more often appliances that have recently yielded one or more matches, as recently-yielding-match appliances may be more likely to yield matches again for the new data zone match request. Additionally, appliances that have not recently yielded matches (e.g., after passing of a predetermined period of time, after a predetermined number of no-match or a lack of responses, etc.) may be "aged out" (e.g., removed from a list of appliances that may be queried first and/or more often for the next new data zone match request).

As will be discussed below, each appliance's counter may be initially set to a maximum (MAX) value. When an appliance yields a data zone match for a newly received data zone and/or is used to deduplicate a new data zone, the appliance's counter may be set to the MAX value (if the counter was previously decremented and the appliance yielded a match, the counter's value is set to MAX value again). When an appliance does not yield a match and/or is not used for deduplication, its counter may be decremented (e.g., by one) unless the counter is already zero. The MAX value may be used to determine how many lookups without using a match may be required to "age out" a particular appliance.

In some implementations, appliance-local level-1 lookup of any possible data zone matches may be performed first. If a local level-1 data zone match is obtained from an appliance, other appliances might not need to be queried for matches. However, if an appliance does not yield a local level-1 data zone match, other appliances may be queried to ascertain whether they contain a matching data zone. When other appliances are queried, all appliances with non-zero counter values and round-robin 1/R of the servers that have zero counters are queried, where value R may determine how often "aged out" appliances may be queried and thus how quickly it may be determined whether an "aged out" appliance is once again yielding matches.

Figure 9:
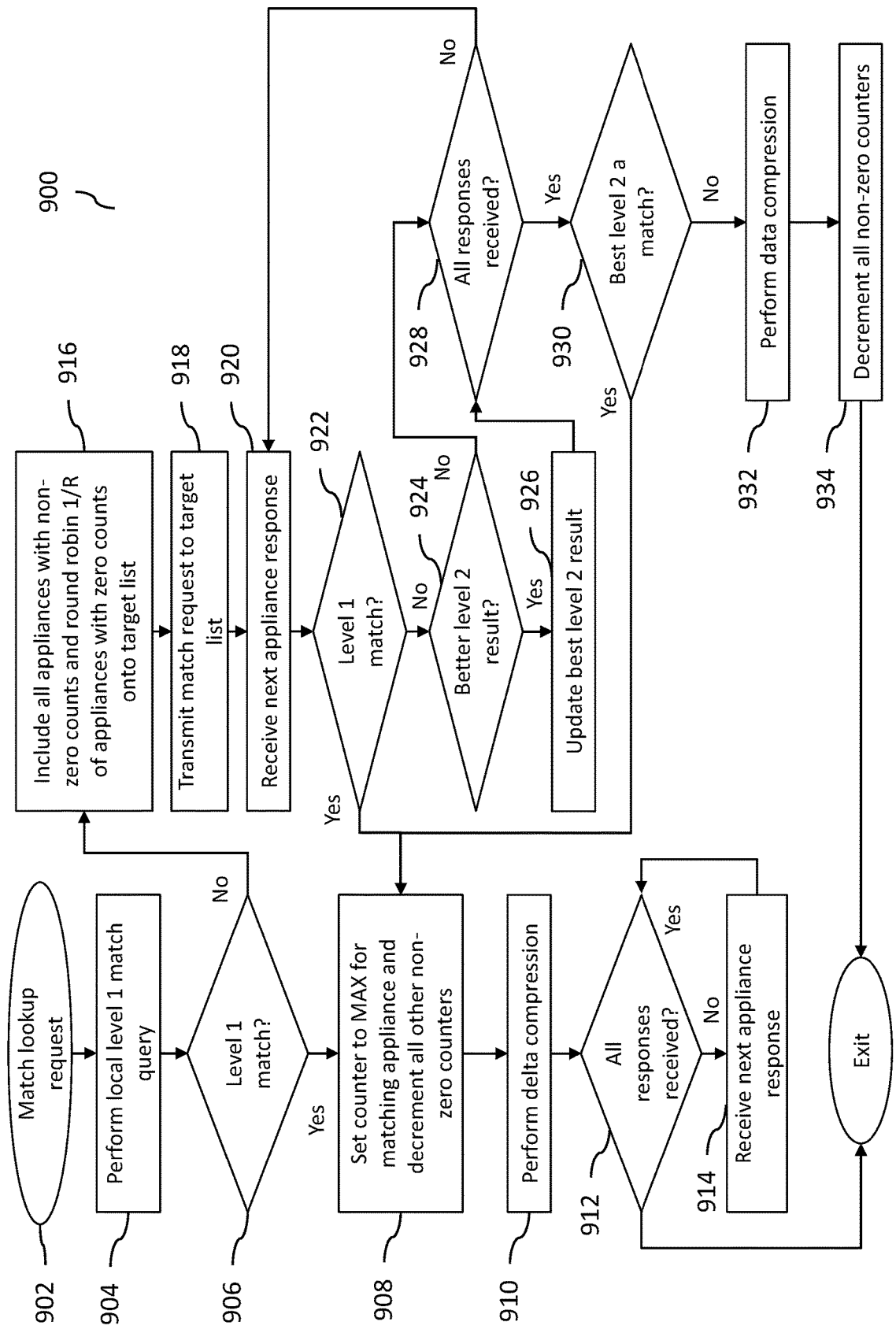
FIG. 9 illustrates an exemplary stamp matching process as performed at a client side, according to some implementations of the current subject matter.

FIG. 9 illustrates an exemplary stamp matching process 900 as may be performed at a client side, according to some implementations of the current subject matter. The process 900 may be configured to be executed by the system 700 shown in FIG. 7 using a counter system 800 shown in FIG. 8. Referring to FIG. 9, at 902, an appliance may be configured to execute a match lookup of zone stamps (e.g., which may have been previously generated) for a newly received zone.

At 904, a level-1 match of a new zone may be performed on the same appliance (e.g., appliance 1 shown in FIG. 8) that it is stored on. At 906, a determination may be made whether a local (e.g., on that appliance) level-1 match is found. If so, other appliances in the deduplication site are not queried. The counter of that appliance (e.g., counter 802a shown in FIG. 8) is set to a maximum value and the remaining appliances' counters may be decremented by one, unless they already zero, at 908.

At 910, delta compression of the newly received zone that matched at level-1 may be performed. If there are outstanding match request responses that still need to be received, the 912-914 loop may be configured to receive any remaining responses. Then, the process 900 may be configured to terminate once all responses are received.

However, if at 906, level-1 match on the local appliance is not found, a target list of appliances to query may be generated based on the counter values (e.g., counter values 802 shown in FIG. 8 that may be stored in a target table) that may be maintained on this appliance to perform a match request, at 916. In particular, all appliances having non-zero counters 802 may be added to the target list and a round-robin selection of 1/R of the appliances having zero counts may also be added to the target list. The R value may be configurable value (e.g., 8 or any other value) and may be used to determine how often to try querying a particular appliance that has a zero counter. This reduced querying rate may allow an appliance that has not yet returned matches to eventually have its counter set to maximum value if it starts to generate matches again.

At 918, the match request may be transmitted to the set of appliances included on the generated target list. In some implementations, the current subject matter may be configured to process one response from an appliance at a time. In alternate implementations, multiple responses may be processed from one or more appliances simultaneously, and/or in any predetermined order. For ease of illustration only, the following description will refer to processing one response from an appliance at a time.

At 920, the process 900 may wait for a response from any of the appliances to which the request was transmitted, in 918. When a response is received, the process 900 may then proceed to 922.

At 922, a determination may be made whether a level-1 match is identified in an appliance identified in the target list. If a match is identified, it may be used for other level-1 or level-2 responses. Once level-1 match is identified, the counter may be set to a maximum value for the appliance on the target list that had a matching result and counters of other appliances that did not have matching result can be decremented or initialized (e.g., decremented by one, set to zero, etc.), at 908. The processing then proceeds to 910, as discussed above.

If no level-1 match is identified, at 922, the processing proceeds to 924, where level-2 results may be analyzed to determine the best level-2 match. Each time a better level-2 match result is received, the best level-2 match received so far may be updated, at 926. Otherwise, this loop (e.g., "No" at 924 and 928) may continue until all appliances' level-2 responses are received, at 928. The best of the level-2 responses may be processed as a match or a non-match, at 930.

If no level-1 match is identified, at 922, the processing proceeds to 924, where the level-2 result is compared to the best level-2 response received thus far to determine if the current response contains a better level-2 response. If it is a better response, the best level 2 match may be updated, at 926. The processing then proceeds to 928 to check if responses from all appliances on the target list have been received. If there are more responses, the process loops back to 920. If all responses have been received, the process proceeds to 930.

If, at 930, the best level-2 result is a match, the process may then proceed to 908 to process that match as discussed earlier. Otherwise, if no level-2 match is received, a data compression of the received zone may be executed, at 932, and all non-zero counters may be decremented, at 934. Subsequently, the process 900 may be configured to terminate.

Figure 10:
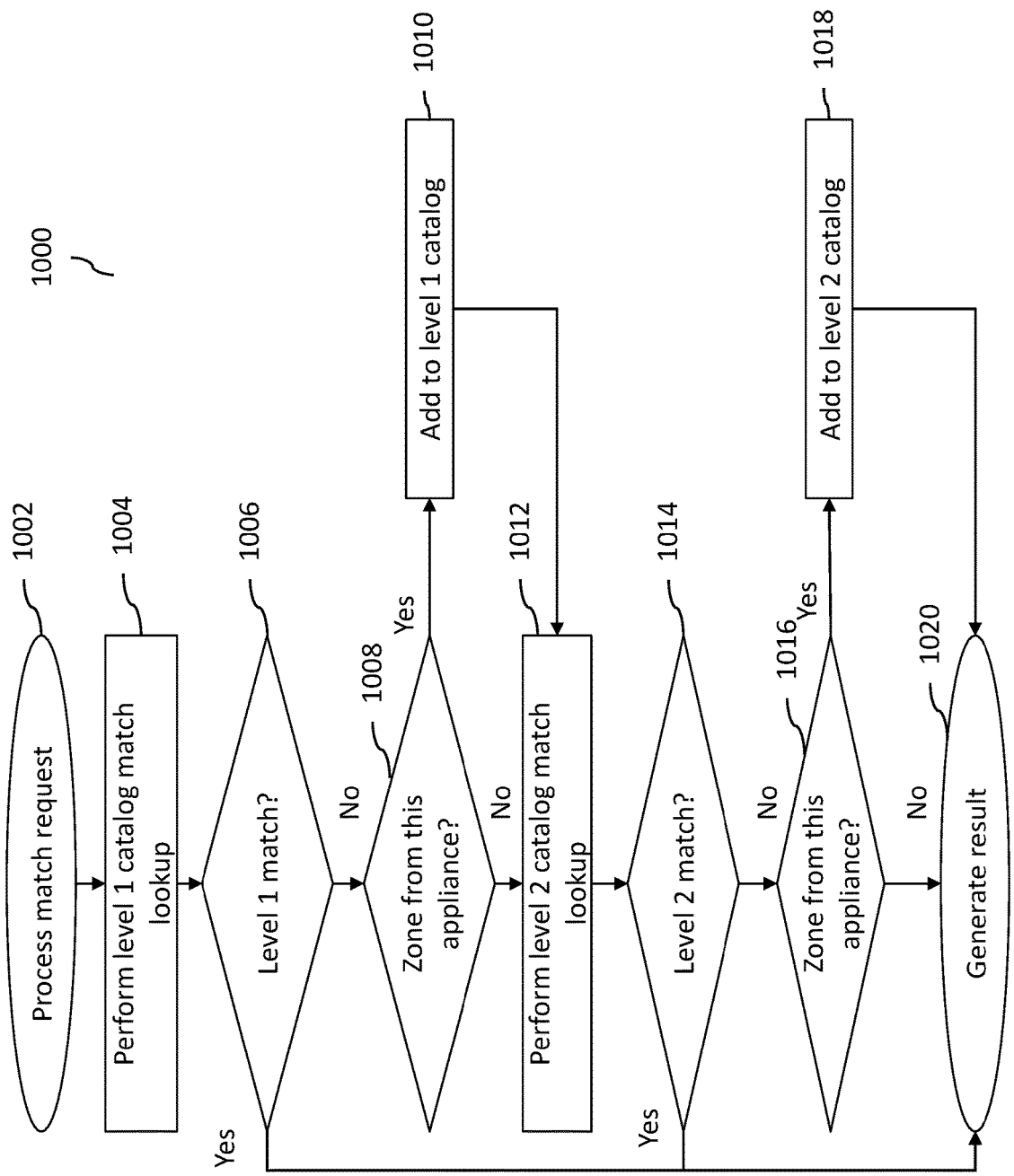
FIG. 10 illustrates an exemplary stamp matching process as performed at a server side, according to some implementations of the current subject matter.

FIG. 10 illustrates an exemplary stamp matching process 1000 as performed at a server side, according to some implementations of the current subject matter. The process 1000 may be configured to be executed by a server (e.g., a server 314 shown in FIG. 3b). At 1002, a server may be configured to process a request to match a data zone, where the request may have been received from the client (e.g., client 312 as shown in FIG. 3b). At 1004, the server may be configured to perform level-1 match lookup using a zone stamp catalog. If, at 1006, there is a level-1 match to the newly received data zone, the server may be configured to generate/output a result, at 1020.

If there is no level-1 match at 1006, the server may be configured to determine whether the newly received data zone is located on the specific appliance associated with the server. If so, the catalog on the appliance may be updated with data zone's information (e.g., level-1 catalog portion) accordingly, at 1010. Once updated or if, at 1008, the newly received zone is not matching to any level-1 zones stored on that appliance, the server may be configured to perform a level-2 match lookup using the level-2 zone stamp catalog, at 1012.

If level-2 match is found, at 1014, the server may be configured to generate/output a corresponding result, at 1020. If not, at 1016 the server may determine whether the received data zone is matching to any other data zone on that appliance at level-2. If so, the data zone information may be added to the level-2 catalog, at 1018. Then, as well as if the data zone cannot be located in the level-2 catalog, the server may generate/output a result of its lookup, at 1020.

FIG. 11 illustrates a chart 1100 showing comparison of various tests that were executed using 32 appliances. Each of the appliances received their own test data and deduplicated it. The test was then executed again where the data was shuffled so that one quarter of the data was written to the local appliance and three quarters of the data was written to other appliances in the site. The shuffle test was repeated for all appliances executing only local match lookups, doing match lookups to all servers in the site, and then using the new lookup algorithm. In particular, as shown in FIG. 11, the "local lookup only, data not shuffled" column shows the test results when each appliance received the entirety of its own test data stream. The "local lookup only, data shuffled" column shows the test results when the data was shuffled between appliances and only local match lookups were performed. Because the data was shuffled between appliances in the site, local only match lookups results in fewer matches being found and a lower deduplication ratio. The deduplication ratio is only 52.69% of the deduplication ratio when the data was not shuffled. The "global lookup, data shuffled" column shows the results with shuffled data when all match requests are transmitted to all 32 appliances at the site. Sending all match requests to all appliances results in 100% of the non-shuffled deduplication ratio, eliminating the loss in match rate due to the data getting shuffled, but it also results in the average number of match lookups per server increasing 32x. The "new lookup, data shuffled" column shows the results using current subject matter algorithms described herein. Instead of average match lookups increasing 32x, they are only increased 3.35x, while still achieving 99.5% of the best case deduplication ratio.

FIG. 12 illustrates a chart 1200 showing comparison of the current subject matter's algorithms executed in three production system environments. The "current subject matter system's" results are compared to "existing system" that always queries all appliances at the site. The results show a significant reduction in the amount of match requests generated while having minimal impact on the overall deduplication ratio. Sites A, B, and C correspond to three different production deployments with different types of backup data. Each has a different overall deduplication ratio, and in each case significantly reducing the total average lookup operations had minimal negative impact on that deduplication ratio. Hence, replacement of the segmented level-1 stamp catalog with local stamp catalogs, as discussed herein, eliminated all of the distribution/redistribution challenges using the previous scheme.

Figure 13:
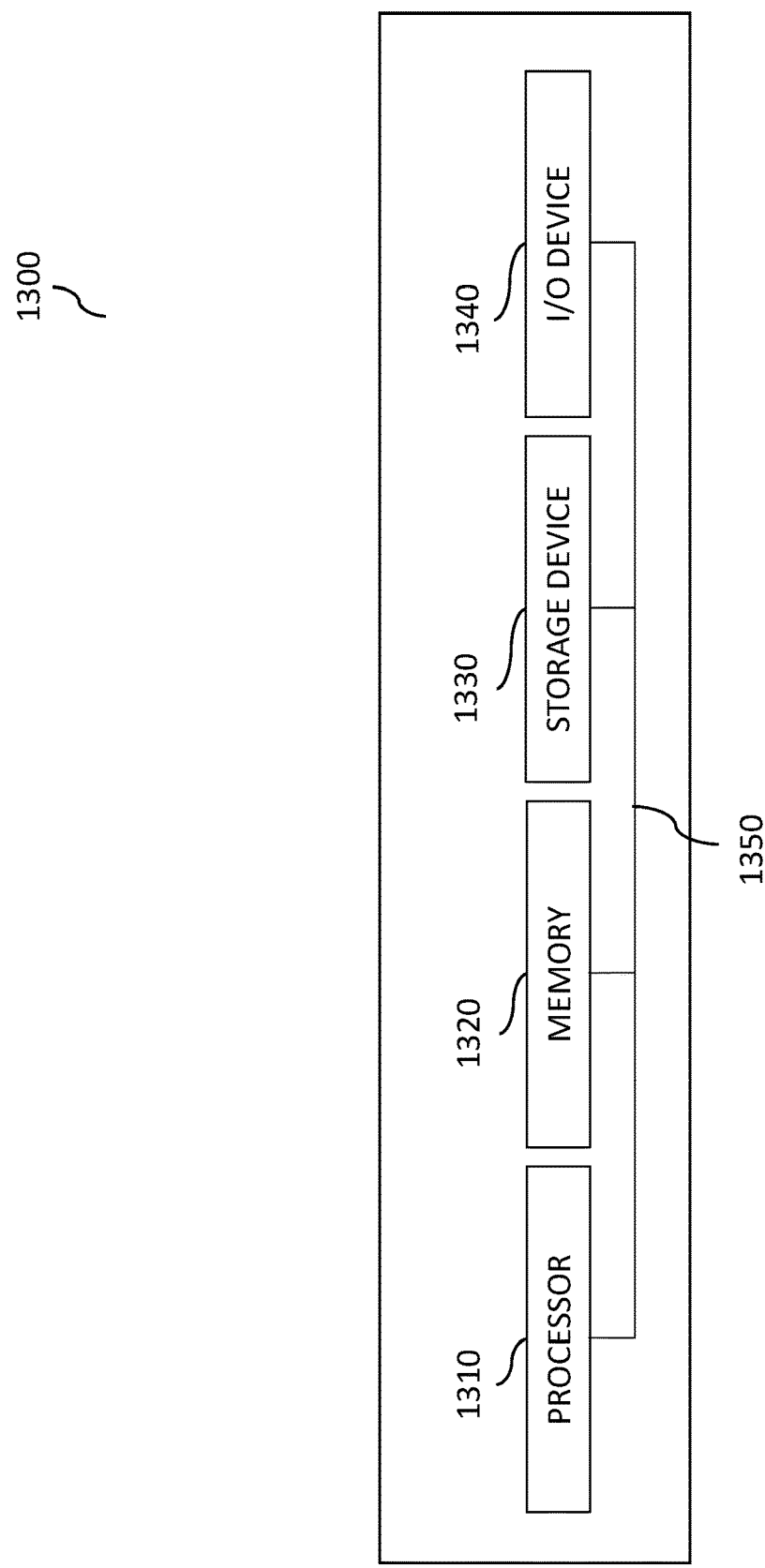
FIG. 13 illustrates an exemplary system, according to some implementations of the current subject matter.

In some implementations, the current subject matter can be configured to be implemented in a system 1300, as shown in FIG. 13. The system 1300 can include a processor 1310, a memory 1320, a storage device 1330, and an input/output device 1340. Each of the components 1310, 1320, 1330 and 1340 can be interconnected using a system bus 1350. The processor 1310 can be configured to process instructions for execution within the system 1300. In some implementations, the processor 1310 can be a single-threaded processor. In alternate implementations, the processor 1310 can be a multi-threaded processor. The processor 1310 can be further configured to process instructions stored in the memory 1320 or on the storage device 1330, including receiving or sending information through the input/output device 1340. The memory 1320 can store information within the system 1300. In some implementations, the memory 1320 can be a computer-readable medium. In alternate implementations, the memory 1320 can be a volatile memory unit. In yet some implementations, the memory 1320 can be a non-volatile memory unit. The storage device 1330 can be capable of providing mass storage for the system 1300. In some implementations, the storage device 1330 can be a computer-readable medium. In alternate implementations, the storage device 1330 can be a floppy disk device, a hard disk device, an optical disk device, a tape device, non-volatile solid state memory, or any other type of storage device. The input/output device 1340 can be configured to provide input/output operations for the system 1300. In some implementations, the input/output device 1340 can include a keyboard and/or pointing device. In alternate implementations, the input/output device 1340 can include a display unit for displaying graphical user interfaces.

Figure 14:
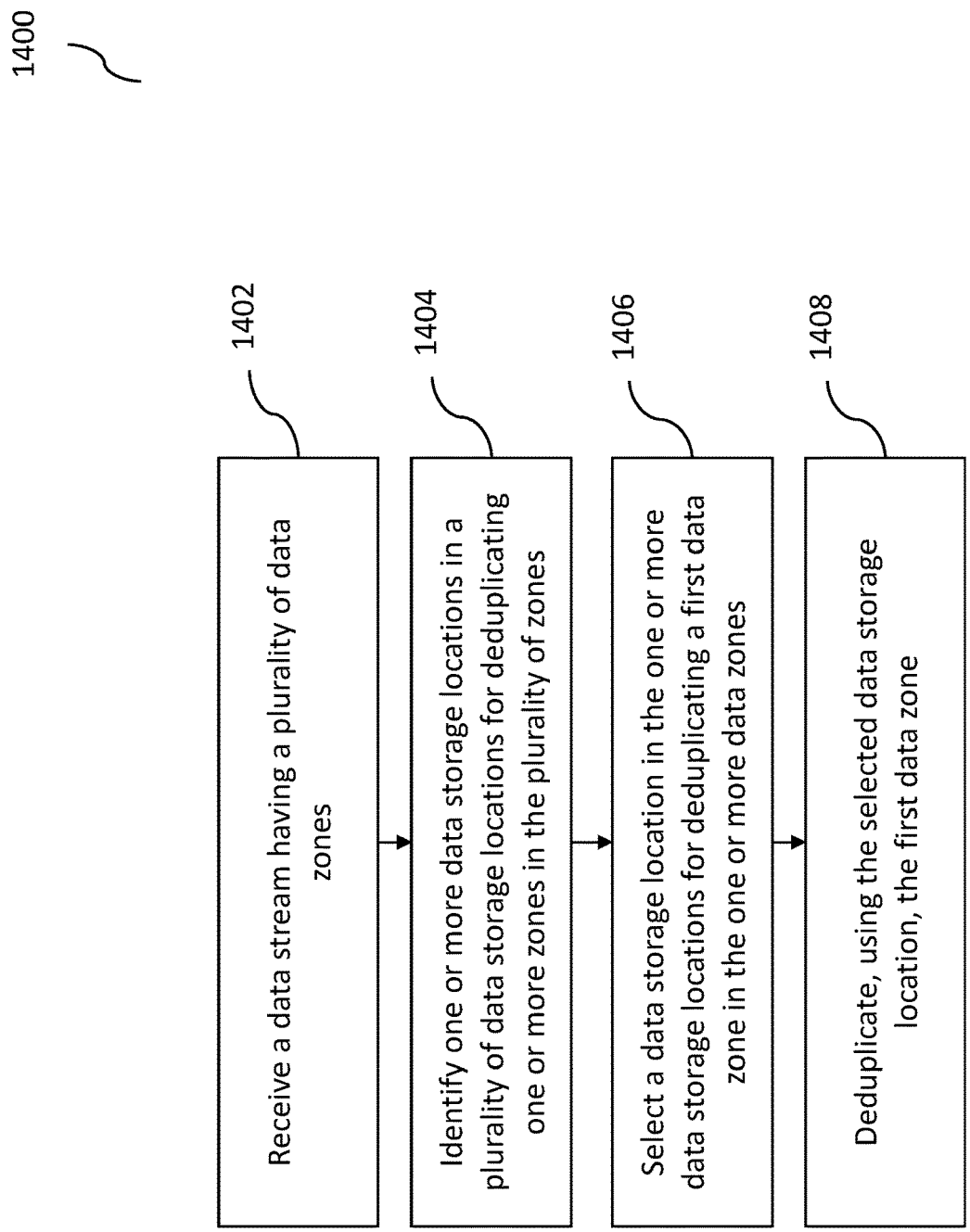
FIG. 14 illustrates an exemplary method, according to some implementations of the current subject matter.

FIG. 14 illustrates an exemplary process 1400 for executing a deduplication process, according to some implementations of the current subject matter. The process may be executed by one or more appliances that may include a server and a client, as shown, for example, in FIG. 3b. At 1402, a data stream having a plurality of data zones may be received. At 1404, one or more data storage locations in a plurality of data storage locations may be identified for deduplicating one or more zones in the plurality of zones. Each data storage location may store its respective deduplicated data zones (e.g., as shown in FIG. 7). At 1406, a data storage location may be selected for deduplicating a first data zone. At 1408, the first data zone may be deduplicated using the selected data storage location.

In some implementations, the current subject matter can include one or more of the following optional features. Each data zone in the plurality of data zones may be identified using a zone stamp. Further, each data storage location may store one or more zone stamps corresponding to the data storage location's respective deduplicated data zones.

In some implementations, the selection of a storage location (e.g., appliance) may include comparing a first zone stamp of the first data zone to one or more zone stamps stored at the selected data storage location. Upon determination of a match of the first zone stamp of the first data zone to one or more zone stamps stored at the selected data storage location, a value of a data zone counter associated with the selected data storage location may be set to a maximum value, which may be indicative of a match of the first data zone to the one or more data zones stored at the selected data storage location. Further, a value of data zone counters associated with non-selected data storage locations may be decremented (e.g., decreased, set to zero, etc.) being indicative of a lack of a match of the first data zone to the one or more data zones stored at the non-selected data storage locations. Further, the first data zone may be delta-compressed against one or more data zones stored at the selected data storage location.

In some implementations, upon determination of a lack of a match of the first zone stamp of the first data zone to the one or more zone stamps stored at the selected data storage location the first data zone may be data-compressed and stored in the selected storage location.

In some implementations, identification of one or more data storage locations in a plurality of data storage locations may include generating a list of data storage locations in the plurality of storage locations, and comparing the first zone stamp to zone stamps of each data storage location in the generated list of data storage locations.

In some implementations, the list may be generated based on at least one of the following: a frequency of previous zone stamp matches by a storage location in the plurality of storage locations, a previous zone stamp match by a storage location in the plurality of storage locations, a positive counter value associated with a storage location in the plurality of storage locations being indicative of one or more previous zone stamp matches by a storage location in the plurality of storage locations, a number of times a storage location in the plurality of storage locations, having a positive counter value, that has not generated a data zone match, and any combinations thereof. Further, the method may include selecting a first storage location in the generated list of data storage locations generating a previous zone stamp match, and comparing the first zone stamp to zone stamps using the first storage location. Additionally, the method may exclude one or more data storage locations in the plurality of data storage location from inclusion on the generated list based on a number of times the one or more data storage locations failed to generate a data zone match.

In some implementations, selection of data storage location may include identifying a first data storage location in the plurality of storage locations for deduplicating a first data zone in the plurality of data zones, and determining whether the first data storage location stores a previously deduplicated data zone substantially similar to the first data zone. Upon determining a match between the previously deduplicated data zone and the first data zone at a first zone level, the first data storage location may deduplicate the first data zone. Upon determining that the first data storage location does not store previously deduplicated data zone matching the first data zone at the first zone level, a determination may be made whether another data storage location in the plurality of storage locations stores a previously deduplicated data zone matching the first data zone at at least one of the following: the first zone level and a second zone level, wherein data zones deduplicated at the second zone level are configured to be contained within data zones deduplicated at the first zone level.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
    receiving a data stream having a plurality of data zones;
    identifying one or more data storage locations in a plurality of data storage locations for deduplicating one or more zones in the plurality of zones, each data storage location storing its respective deduplicated data zones, the one or more identified data storage locations are included in a list of data storage locations generated for deduplicating one or more zones;
    selecting a data storage location in the list of data storage locations for deduplicating a first data zone in the one or more data zones; and
    deduplicating, using the selected data storage location, the first data zone.

2. The method according to claim 1, wherein each data zone in the plurality of data zones is identified using a zone stamp.

3. The method according to claim 2, wherein each data storage location stores one or more zone stamps corresponding to the data storage location's respective deduplicated data zones.

4. The method according to claim 3, wherein the selecting further comprises comparing a first zone stamp of the first data zone to the one or more zone stamps stored at the selected data storage location.

5. The method according to claim 4, wherein upon determination of a match of the first zone stamp of the first data zone to the one or more zone stamps stored at the selected data storage location,
    setting a value of a data zone counter associated with the selected data storage location to a maximum value being indicative of a match of the first data zone to the one or more data zones stored at the selected data storage location;
    decrementing values of data zone counters associated with non-selected data storage locations being indicative of a lack of a match of the first data zone to the one or more data zones stored at the non-selected data storage locations; and
    delta-compressing the first data zone against the one or more data zones stored at the selected data storage location.

6. The method according to claim 4, wherein upon determination of a lack of a match of the first zone stamp of the first data zone to the one or more zone stamps stored at the selected data storage location,
    data-compressing the first data zone; and
    storing the data-compressed first data zone in the selected storage location.

7. The method according to claim 4, wherein the identifying one or more data storage locations in a plurality of data storage locations further comprises
    generating the list of data storage locations in the plurality of storage locations; and
    comparing the first zone stamp to zone stamps of each data storage location in the generated list of data storage locations.

8. The method according to claim 7, wherein the list is generated based on at least one of the following: a frequency of previous zone stamp matches by a storage location in the plurality of storage locations, a previous zone stamp match by a storage location in the plurality of storage locations, a positive counter value associated with a storage location in the plurality of storage locations being indicative of one or more previous zone stamp matches by a storage location in the plurality of storage locations, a number of times a storage location in the plurality of storage locations, having a positive counter value, that has not generated a data zone match, and any combinations thereof.

9. The method according to claim 7, further comprising
    selecting a first storage location in the generated list of data storage locations generating a previous zone stamp match; and
    comparing the first zone stamp to zone stamps using the first storage location.

10. The method according to claim 9, further comprising excluding one or more data storage locations in the plurality of data storage location from inclusion on the generated list based on a number of times the one or more data storage locations failed to generate a data zone match.

11. The method according to claim 1, wherein the selecting includes
    identifying a first data storage location in the plurality of storage locations for deduplicating the first data zone in the plurality of data zones;
    determining whether the first data storage location stores a previously deduplicated data zone substantially similar to the first data zone, wherein
    upon determining a match between the previously deduplicated data zone and the first data zone at a first zone level, deduplicating, by the first data storage location, the first data zone;
    upon determining that the first data storage location does not store previously deduplicated data zone matching the first data zone at the first zone level, determining whether another data storage location in the plurality of storage locations stores a previously deduplicated data zone matching the first data zone at at least one of the following: the first zone level and a second zone level, wherein data zones deduplicated at the second zone level are configured to be contained within data zones deduplicated at the first zone level.

12. A system, comprising:
    at least one programmable processor; and
    a non-transitory machine-readable medium storing instructions that, when executed by the at least one programmable processor, cause the at least one programmable processor to perform operations comprising:
    receiving a data stream having a plurality of data zones;

identifying one or more data storage locations in a plurality of data storage locations for deduplicating one or more zones in the plurality of zones, each data storage location storing its respective deduplicated data zones, the one or more identified data storage locations are included in a list of data storage locations generated for deduplicating one or more zones;

selecting a data storage location in the list of data storage locations for deduplicating a first data zone in the one or more data zones; and deduplicating, using the selected data storage location, the first data zone.

13. The system according to claim 12, wherein each data zone in the plurality of data zones is identified using a zone stamp.

14. The system according to claim 13, wherein each data storage location stores one or more zone stamps corresponding to the data storage location's respective deduplicated data zones.

15. The system according to claim 14, wherein the selecting further comprises comparing a first zone stamp of the first data zone to the one or more zone stamps stored at the selected data storage location.

16. The system according to claim 15, wherein upon determination of a match of the first zone stamp of the first data zone to the one or more zone stamps stored at the selected data storage location, setting a value of a data zone counter associated with the selected data storage location to a maximum value being indicative of a match of the first data zone to the one or more data zones stored at the selected data storage location;

decrementing values of data zone counters associated with non-selected data storage locations being indicative of a lack of a match of the first data zone to the one or more data zones stored at the non-selected data storage locations; and delta-compressing the first data zone against the one or more data zones stored at the selected data storage location.

17. The system according to claim 15, wherein upon determination of a lack of a match of the first zone stamp of the first data zone to the one or more zone stamps stored at the selected data storage location, data-compressing the first data zone; and storing the data-compressed first data zone in the selected storage location.

18. The system according to claim 15, wherein the identifying one or more data storage locations in a plurality of data storage locations further comprises generating the list of data storage locations in the plurality of storage locations; and comparing the first zone stamp to zone stamps of each data storage location in the generated list of data storage locations.

19. The system according to claim 18, wherein the list is generated based on at least one of the following: a frequency of previous zone stamp matches by a storage location in the plurality of storage locations, a previous zone stamp match by a storage location in the plurality of storage locations, a positive counter value associated with a storage location in the plurality of storage locations being indicative of one or more previous zone stamp matches by a storage location in the plurality of storage locations, a number of times a storage location in the plurality of storage locations, having a positive counter value, that has not generated a data zone match, and any combinations thereof.

20. The system according to claim 18, wherein the operations further comprise selecting a first storage location in the generated list of data storage locations generating a previous zone stamp match; and comparing the first zone stamp to zone stamps using the first storage location.

21. The system according to claim 20, wherein the operations further comprise excluding one or more data storage locations in the plurality of data storage location from inclusion on the generated list based on a number of times the one or more data storage locations failed to generate a data zone match.

22. The system according to claim 12, wherein the selecting includes identifying a first data storage location in the plurality of storage locations for deduplicating the first data zone in the plurality of data zones;

determining whether the first data storage location stores a previously deduplicated data zone substantially similar to the first data zone, wherein upon determining a match between the previously deduplicated data zone and the first data zone at a first zone level, deduplicating, by the first data storage location, the first data zone;

upon determining that the first data storage location does not store previously deduplicated data zone matching the first data zone at the first zone level, determining whether another data storage location in the plurality of storage locations stores a previously deduplicated data zone matching the first data zone at at least one of the following: the first zone level and a second zone level, wherein data zones deduplicated at the second zone level are configured to be contained within data zones deduplicated at the first zone level.

23. A computer program product comprising a non-transitory machine-readable medium storing instructions that, when executed by at least one programmable processor, cause the at least one programmable processor to perform operations comprising:

receiving a data stream having a plurality of data zones;

identifying one or more data storage locations in a plurality of data storage locations for deduplicating one or more zones in the plurality of zones, each data storage location storing its respective deduplicated data zones, the one or more identified data storage locations are included in a list of data storage locations generated for deduplicating one or more zones;

selecting a data storage location in the list of data storage locations for deduplicating a first data zone in the one or more data zones; and deduplicating, using the selected data storage location, the first data zone.

24. The computer program product according to claim 23, wherein each data zone in the plurality of data zones is identified using a zone stamp.

25. The computer program product according to claim 24, wherein each data storage location stores one or more zone stamps corresponding to the data storage location's respective deduplicated data zones.

26. The computer program product according to claim 25, wherein the selecting further comprises comparing a first zone stamp of the first data zone to the one or more zone stamps stored at the selected data storage location.

27. The computer program product according to claim 26, wherein upon determination of a match of the first zone stamp of the first data zone to the one or more zone stamps stored at the selected data storage location,
  setting a value of a data zone counter associated with the selected data storage location to a maximum value being indicative of a match of the first data zone to the one or more data zones stored at the selected data storage location;
  decrementing values of data zone counters associated with non-selected data storage locations being indicative of a lack of a match of the first data zone to the one or more data zones stored at the non-selected data storage locations; and
  delta-compressing the first data zone against the one or more data zones stored at the selected data storage location.

28. The computer program product according to claim 26, wherein upon determination of a lack of a match of the first zone stamp of the first data zone to the one or more zone stamps stored at the selected data storage location,
  data-compressing the first data zone; and
  storing the data-compressed first data zone in the selected storage location.

29. The computer program product according to claim 26, wherein the identifying one or more data storage locations in a plurality of data storage locations further comprises
  generating the list of data storage locations in the plurality of storage locations; and
  comparing the first zone stamp to zone stamps of each data storage location in the generated list of data storage locations.

30. The computer program product according to claim 29, wherein the list is generated based on at least one of the following: a frequency of previous zone stamp matches by a storage location in the plurality of storage locations, a previous zone stamp match by a storage location in the plurality of storage locations, a positive counter value associated with a storage location in the plurality of storage locations being indicative of one or more previous zone stamp matches by a storage location in the plurality of storage locations, a number of times a storage location in the plurality of storage locations, having a positive counter value, that has not generated a data zone match, and any combinations thereof.

31. The computer program product according to claim 29, wherein the operations further comprise
  selecting a first storage location in the generated list of data storage locations generating a previous zone stamp match; and
  comparing the first zone stamp to zone stamps using the first storage location.

32. The computer program product according to claim 31, wherein the operations further comprise excluding one or more data storage locations in the plurality of data storage location from inclusion on the generated list based on a number of times the one or more data storage locations failed to generate a data zone match.

33. The computer program product according to claim 23, wherein the selecting includes
  identifying a first data storage location in the plurality of storage locations for deduplicating the first data zone in the plurality of data zones;
  determining whether the first data storage location stores a previously deduplicated data zone substantially similar to the first data zone, wherein
  upon determining a match between the previously deduplicated data zone and the first data zone at a first zone level, deduplicating, by the first data storage location, the first data zone;
  upon determining that the first data storage location does not store previously deduplicated data zone matching the first data zone at the first zone level, determining whether another data storage location in the plurality of storage locations stores a previously deduplicated data zone matching the first data zone at at least one of the following: the first zone level and a second zone level, wherein data zones deduplicated at the second zone level are configured to be contained within data zones deduplicated at the first zone level.

* * * * *